United States Patent
Kagiwada

Patent Number: 5,940,820
Date of Patent: Aug. 17, 1999

[54] GUI APPARATUS FOR GENERATING AN OBJECT-ORIENTED DATABASE APPLICATION

[75] Inventor: Keiji Kagiwada, Kawasaki, Japan

[73] Assignee: Fujitsu Limited, Kawasaki, Japan

[21] Appl. No.: 08/829,426

[22] Filed: Mar. 31, 1997

[30] Foreign Application Priority Data

Sep. 24, 1996 [JP] Japan .................................... 8-251217

[51] Int. Cl.⁶ ................................................. G06F 17/30
[52] U.S. Cl. .................................. 707/3; 707/4; 707/103; 707/104
[58] Field of Search .................................. 707/3, 4, 103, 707/104, 1, 2

[56] References Cited

U.S. PATENT DOCUMENTS

| | | | |
|---|---|---|---|
| 5,263,167 | 11/1993 | Conner, Jr. et al. | 395/700 |
| 5,421,008 | 5/1995 | Banning et al. | 395/600 |
| 5,625,816 | 4/1997 | Burdick et al. | 395/614 |
| 5,634,124 | 5/1997 | Khoyi | 395/614 |
| 5,692,175 | 11/1997 | Davies et al. | 395/603 |
| 5,721,911 | 2/1998 | Ha et al. | 395/611 |
| 5,729,738 | 3/1998 | Watanabe et al. | 395/614 |

OTHER PUBLICATIONS

Balkir et al. "Visual: A Graphical Icon–Based Query Language" IEEE, pp. 524–533, Feb. 1996.

Kawamura "Evaluation of Object–Oriented Database for Distribution Network Monitoring System" IEEE, pp. 156–161, May 1996.

Chang "SOPView: A Visual Query and Object Browsing Environment for SOP OODBMS" IEEE, pp. 354–360, Jul. 1996.

Kao "A Windows User Interface to Data Retrieval and Report Generation for a Diabetic Patient Database" pp. 98–103, May 1994.

Collier et al. "A Graphics Intensive Object–Oriented Application for Outside Plant Engineers" IEEE, pp. 336–339, Feb. 1993.

Staes et al. "A Graphical Query Language for Object–Oriented Databases" IEEE, pp. 205–210, May 1991.

Lam et al. "A Graphical Interface for an Object–Oriented Query Language" IEEE, pp. 231–237, Jan. 1990.

*Primary Examiner*—Paul V. Kulik
*Assistant Examiner*—Michael J. Wallace, Jr.
*Attorney, Agent, or Firm*—Staas & Halsey

[57] ABSTRACT

A graphical user interface is employed for generating an object-oriented database (ODB) application. An application information extraction unit extracts application information in response to a screen operation by a user on an actual screen in which links are expanded. A query language generation unit generates a query language including an operation for pursuing the link between objects in correspondence with the extracted application information, and it issues the generated query language to an ODB management system. A retrieval result display control unit receives a retrieved result in the ODB from the ODBMS, and it updates the link-expanding actual screen. A link meta-information management unit registers and manages the query languages which the query language generation unit has generated in correspondence with the screen operations instructed by the user to be registered, as link meta-information which corresponds to the database application indicated by the user. An application execution unit executes the application and displays a user's utilization screen on the basis of the link meta-information.

9 Claims, 6 Drawing Sheets

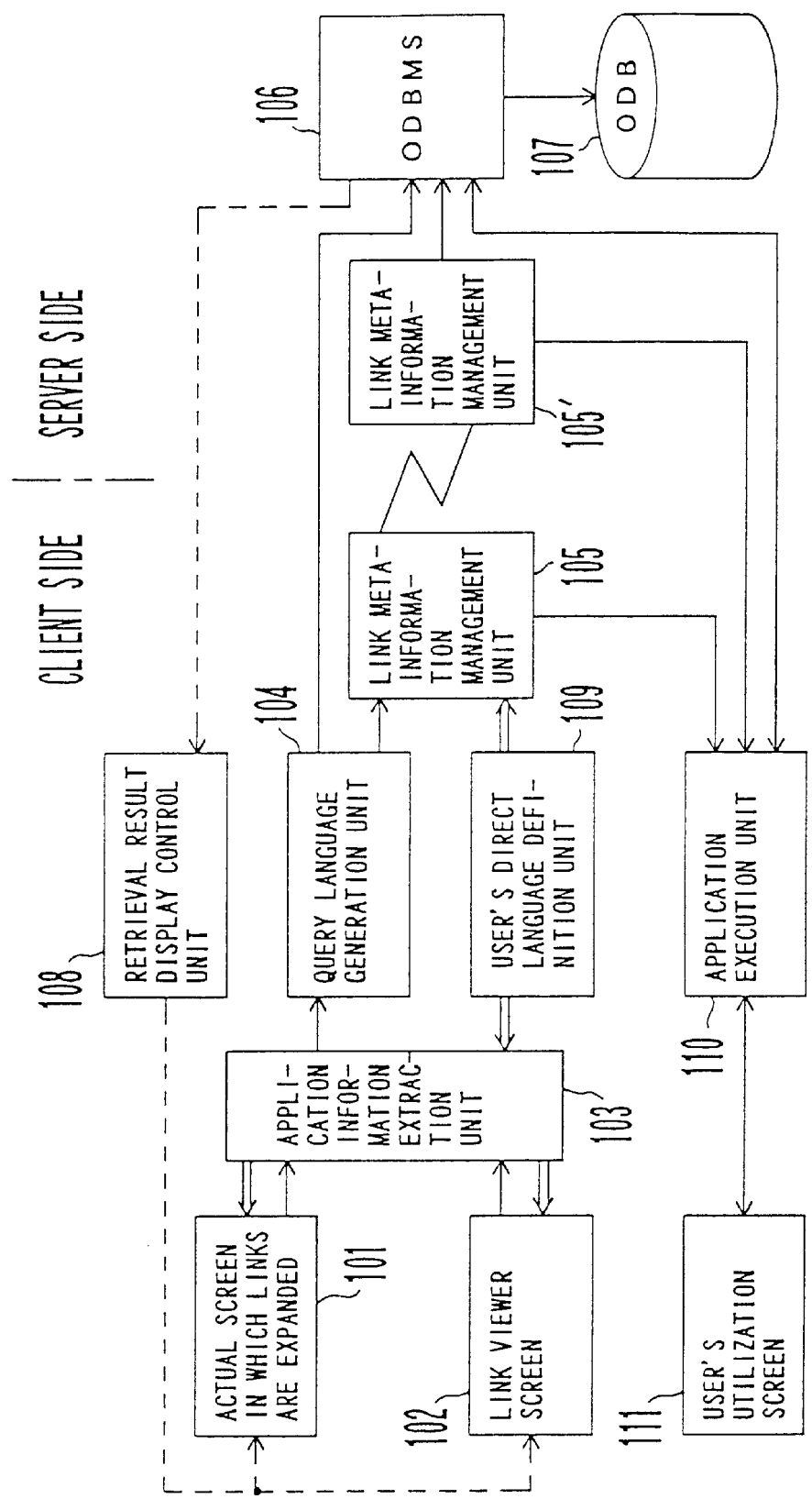
F I G. 1

```
object x11(listBox)              // NAME OF AN OBJECT TO BE HANDLED
  location(135,263)              // LOCATION OF THE OBJECT
  size(20,30)                    // SIZE
  color green                    // COLOR
  access-object obj12,obj35,obj108  // LINK INFORMATION
  projection item54,item23       // DATA ITEMS TO BE PROJECTED
  join obj76,obj34,obj11         // OBJECTS TO BE JOINTED
  related-object x87(parent),x256(child)  // APPLICATION INFORMATION ITEMS IN
                                           PARENT-CHILD RELATIONSHIP
object x31(listBox)
  location(15,26)
  size(15,18)
  color red
  access-object obj11,obj98
  projection item22,item43
  join obj66,obj21
  related-object x12(parent)
```

FIG. 3

```
obj21    set os, o;                          // OPERANDS FOR STORING THE INSTANCES OF AN OBJECT "obj 21"
obj763   o763;                               // OPERANDS FOR STORING THE INSTANCES OF AN OBJECT "obj 763"
defaultOB ODB-model;                         // DESIGNATION OF A DATABASE Transaction.start();                         // START OF A TRANSACTION os = obj21 from obj21                        // RETRIEVALS OF THE INSTANCES OF THE OBJECT "obj 21"
scan(os,o)
  {o.obj763.item211.get();};                 // PROCESSING FOR GAINING DESIGNATED DATA Transaction.end();                           // END OF THE TRANSACTION
```

FIG. 4

```
user-name: amada
appli-name: appl123
db-name: ODB-model
short-cut: obj21.obj763.item54
mapping: (obj22, PRODUCT CLASS), (obj62, PRICE CLASS), (item211, DATE)

user-name: tanaka
appli-name: inf22
db-name: Product
short-cut: class901.prop77
mapping: (class42, PRICE), (prop001, NAME)
```

FIG. 5

GUI APPARATUS FOR GENERATING AN OBJECT-ORIENTED DATABASE APPLICATION

BACKGROUND OF THE INVENTION

1. Field of the Invention

The present invention relates to techniques for efficiently generating an application which runs for the navigation among objects contained in an object-oriented database.

2. Description of the Related Art

One of the features of an object-oriented database (ODB) is the function of navigation. This function establishes relations among objects contained in the database, so that links (relational attributes) generated by the established relations can be pursued. By way of example, the specified item of each instance of an object A has the object identifier of each instance of an object B prestored therein, whereby when the object A has been accessed, the object B can be subsequently accessed. As a more concrete example, let's consider a case where the No. information of commodities and the price information thereof are stored in the object A, while the photograph information of the commodities is stored in the object B. In this case, when an instance corresponding to a specified commodity contained in the object A has been accessed, the photograph of the specified commodity can be easily taken out by subsequently accessing the object B.

Heretofore, in order to realize the navigation among objects contained in a database, a system administrant having a special ability has directly described and programmed desired navigational operations with a specified database query language such as SQL (Structured Query Language).

In order to utilize such a prior-art technique, however, the usage of the database query language must be mastered. Therefore, general end users difficulty of utilizing the prior-art technique as stated above, and they have been unable to readily realize the navigation among the objects within the database.

Proposed for coping with such a problem is a technique wherein the navigation among the objects contained in the database is realized using a GUI (Graphical User Interface). With this technique, the end user can pursue the links of the objects graphically displayed on a screen, while successively clicking the links with a mouse for example. Thus, he/she can realize the interactive navigation searching for the object within the database.

In such navigation based on the GUI, however, the links are usually pursued one by one. The reason therefor is that, in a case where the links are set in multilevel fashion among the plurality of objects, such information items as follows are dependent upon users or applications:

How far the links are continuous?

Which object the user of the GUI wants to pursue as a link goal?

Where the navigation is stopped in case of an endless loop (or a recursive loop) formed by the links themselves?

To interactively pursue the links one by one in search of the object within the database in this manner, is very effective when developing an application by the method of trial and error and for learning the structure and contents of the database. However, in a case where the utilization of the navigational function employing the GUI is intended for developing an efficient application in which an accessibility to the database and good use of database resources are taken into consideration, especially a point-to-point service application, the results of the navigation are not directly reflected in the program contents of the application. This poses the problem that the navigational function employing the GUI cannot serve as an effective tool for the application development.

SUMMARY OF THE INVENTION

The present invention has been made with the above background, and has for its object to incarnate the efficient development of a database application on the basis of the results of navigation employing a GUI. A GUI apparatus in the first aspect of performance of the present invention is constructed as stated below.

An application information extraction unit (application information extraction unit 103 in FIG. 1) extracts application information required for an access to an object-oriented database (ODB 107), in response to a user's screen operation including an operation for pursuing the link between objects contained in the object-oriented database.

Upon receiving the application information, a query language generation unit (query language generation unit 104) generates a query language including the link pursuing operation, in correspondence with the received information. Thereafter, it issues the query language to an object-oriented database management system (ODBMS 106) for managing the object-oriented database.

A retrieval result display control unit (retrieval result display control unit 108) receives a retrieved result from the object-oriented database management system. In accordance with the retrieved result, it displays a screen containing the linkages or linked relations among objects within the object-oriented database (actual screen 101 in which links are expanded), for the purpose of prompting the user of the GUI apparatus to conduct screen operations.

Link meta-information management units (link meta-information management units 105 and 105') register and manage the query languages generated by the query language generation unit, these query languages being generated in correspondence with the screen operations instructed by the user to be registered, as link meta-information corresponding to a database application indicated by the user.

An application execution unit (application execution unit 110) executes the database application indicated by the user, on the basis of the link meta-information.

Owing to the above construction in the first aspect of performance of the present invention, the user merely conducts, with a mouse or the like, the navigational screen operations for pursuing the links between the objects contained in the object-oriented database, whereby he/she can automatically create the appropriate database application having such a navigational function.

In the first aspect of performance of the present invention as explained above, the GUI apparatus can be so constructed as to further comprise a user-defined screen display unit to which a query language designated directly by the user is input and which displays a screen corresponding to the input query language and containing the linkages or linked relations among objects within the object-oriented database, for the purpose of prompting the user to conduct screen operations (user's direct language definition unit 109, application information extraction unit 103). In this case, the user conducts screen operations including an operation for pursuing the link between objects contained in the object-oriented database, on the screen displayed by the user-defined screen display unit.

Owing to the allowance of such direct language definition by the user, a power user et al. can develop the database application more efficiently.

A GUI apparatus in the second aspect of performance of the present invention is constructed as stated below.

An application information extraction unit (application information extraction unit 103 in FIG. 1) extracts application information items which include information on an object within an object-oriented database (ODB 107) as pointed out by the user of the GUI apparatus, and information for issuing a command for the recursive retrieval of other objects within the object-oriented database as linked to the pointed-out object.

Upon receiving the application information items, a query language generation unit (query language generation unit 104) generates a query language for giving the command for the recursive retrieval of the other objects linked to the object pointed out by the user, in correspondence with the received information items. Thereafter, it issues the query language to an object-oriented database management system (ODBMS 106) for managing the object-oriented database.

A link viewer screen display unit (retrieval result display control unit 108) receives a retrieved result from the object-oriented database management system. In accordance with the retrieved result, it displays all the linkages or linked relations among the object pointed out by the user and the other objects linked thereto, as a link viewer screen (link viewer screen 102).

Link meta-information management units (link meta-information management units 105 and 105') register and manage the query languages issued for the generation of the link viewer screen by the query language generation unit, these query languages corresponding to the linkages pointed to on the link viewer screen by the user, as link meta-information corresponding to a database application indicated by the user.

An application execution unit (application execution unit 110) executes the database application indicated by the user, on the basis of the link meta-information.

Owing to the operations employing such a link viewer screen, the user can survey all the linkages among the objects contained in the object-oriented database, and he/she can develop the database application more efficiently.

In the second aspect of performance of the present invention as explained above, the GUI apparatus can be so constructed as to further comprise a user-defined screen display unit to which a query language designated directly by the user is input and which displays the link viewer screen corresponding to the input query language and containing the linkages or linked relations among objects within the object-oriented database (user's direct language definition unit 109, application information extraction unit 103). In this case, the user points to the linkages on the link viewer screen displayed by the user-defined screen display unit.

Herein, as in the case of the first aspect of performance of the present invention, a power user et al. can develop the database application more efficiently.

As thus far explained, according to the present invention, all system administrants and all users including end users and power users can incarnate the development/maintenance of an application easily and efficiently with a GUI, without needing any special knowledge of a database query language. Moreover, the GUI apparatus of the present invention can be utilized also as a debugging tool in the case where any problem has occurred in the service of the application.

BRIEF DESCRIPTION OF THE DRAWINGS

The other objects and features of the present invention will be readily understood by one skilled in the art from the description of the preferred embodiments of the present invention when read in conjunction with the accompanying drawings, wherein:

FIG. 1 is a block diagram showing the architecture of the preferred embodiment of the present invention;

FIG. 3 is a diagram showing a practicable example of information items which are necessary for an application;

FIG. 4 is a diagram showing a practicable example of a query language;

FIG. 5 is a diagram showing a practicable example of link meta-information.

DESCRIPTION OF THE PREFERRED EMBODIMENTS

Figure 2:
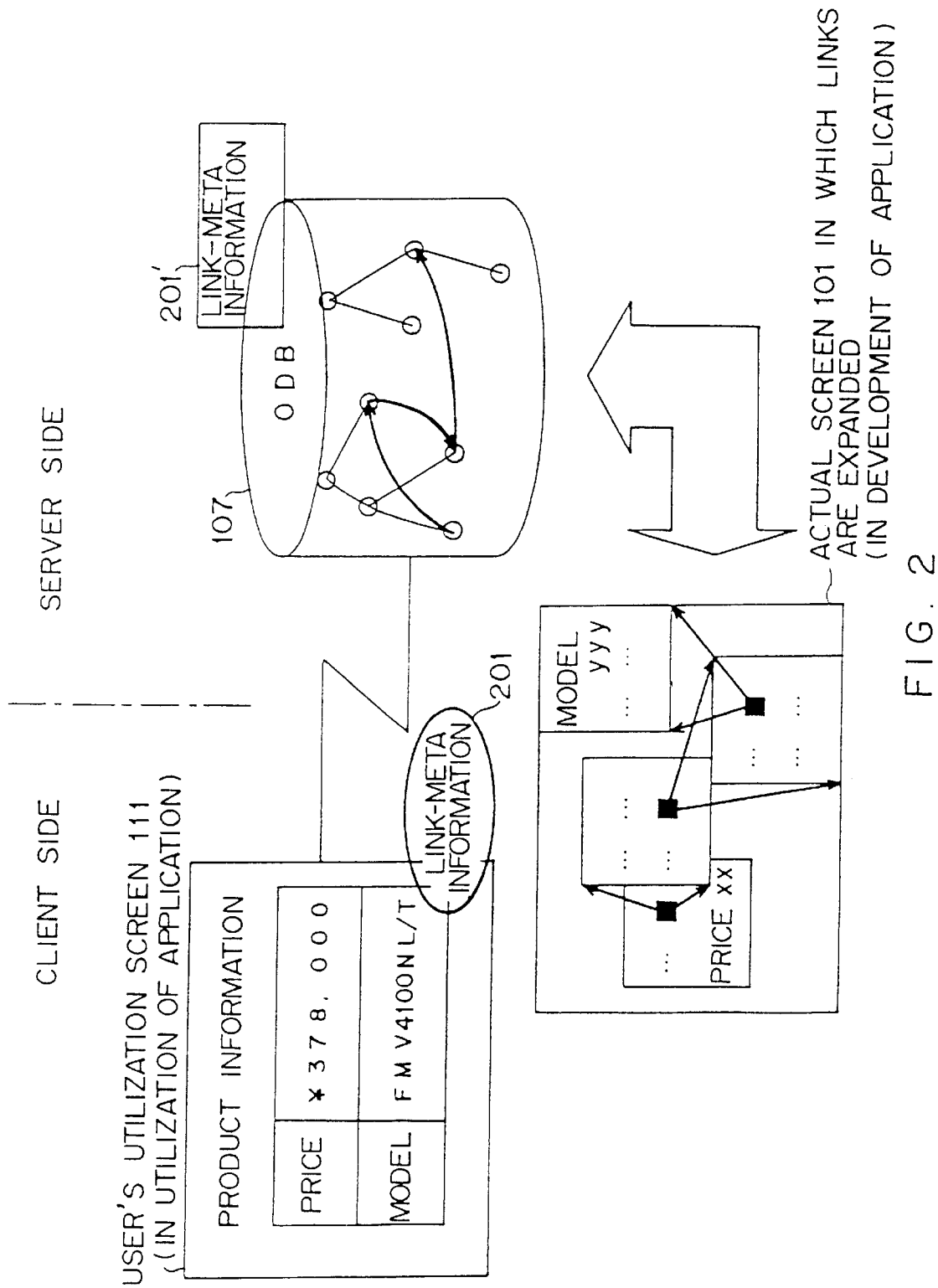
FIG. 2 is a diagram showing the image of utilization of the preferred embodiment of the present invention.

Now, the preferred embodiments of the present invention will be described in detail with reference to the drawings.

FIG. 1 is a block diagram showing a GUI (graphical user interface) apparatus in the preferred embodiment of the present invention. An actual screen 101 in which links are expanded, a link viewer screen 102, an application information extraction unit 103, a query language generation unit 104, a link meta-information management unit 105, a retrieval result display control unit 108, a user's direct language definition unit 109, an application execution unit 110 and a user's utilization screen 111 are constructed in a client computer (or on a client side). On the other hand, a link meta-information management unit 105', an ODBMS (ODB management system) 106 and an ODB (object-oriented database) 107 are constructed in a server computer (or on a server side).

In this preferred embodiment, the user of the GUI apparatus can select any of the following cases for the development of a database application:

(1) Case where the application having the function of navigation is developed by starting from a GUI (the actual screen 101 in which links are expanded);

(2) Case where the application having the function of navigation is developed by starting from a GUI (the link viewer screen 102);

(3) Case where the skeleton of the application is directly defined with a database query language, and where the details of the application are successively developed while the defined contents are being displayed with a GUI.

Constructions and operations in the respective cases will be explained below.

(1) Case where the application having the function of navigation is developed by starting from a GUI (the actual screen 101 in which links are expanded)

In this case, the user on the client side in FIG. 1 can successively pursue the links between objects contained in the object-oriented database (ODB) 107, with a mouse on the actual screen 101 in which links are expanded being a screen which can directly display the contents of the respective instances of the object. Herein, as illustrated in FIG. 2 by way of example, a window (the first window) corresponding to the instance of the object is displayed on the screen. When, in this state, the mouse is clicked with its cursor brought to a specified portion within the displayed window (the first window), the window (the second window) of another object linked to the object corresponding to the displayed window (the first window) appears on the screen. Subsequently, when the mouse is further clicked with its cursor brought to a specified portion within the displayed window (the second window) of the other object, the window (the third window) of still another object linked to the object corresponding to the window (the second window) appears on the screen. More concretely, the links can be successively pursued from the object in which the price information items of products are stored, up to the object in which the model information items of the products are stored.

Each time the user conducts the above GUI operation on the actual screen 101 in which links are expanded, the application information extraction unit 103 on the client side successively extracts information items which are necessary for the application corresponding to the current screen, and it transmits the extracted information items to the query language generation unit 104. The information items include, for example, information for establishing the correspondence between each resource of every screen object on the actual screen 101 in which links are expanded and each item of every object within the database, and information for indicating a database operation required for the generation of each screen object. Now, when the application is to be developed, the user conducts GUI operations for pursuing the links between the objects, on the actual screen 101 in which links are expanded. In this case, the application information extraction unit 103 extracts the object information etc. corresponding to the links pointed to by the user and transmits them to the query language generation unit 104.

FIG. 3 is a diagram showing a practicable example of information items which are necessary for the application. Referring to the figure, the information "object x11(listBox)", for example, declares the start of the definition of a screen object "x11" for displaying a screen resource called "list box" on the actual screen 101 in which links are expanded. The information "location(135,263)" indicates the display location of the screen object "x11" on the actual screen 101 in which links are expanded. The information "size(20,30)" indicates the size (vertical and horizontal dimensions) of the screen object "x11". The information "color green" indicates the color of the screen object "x11". The information "access-object obj12,obj35,obj108" is link information which expresses that objects "obj12", "obj35" and "obj108" within the ODB 107 should be accessed in order to display the screen object "x11". The information "projection item54,item23" is projection information which expresses that items "item54" and "item23" contained in the objects within the ODB 107 should be accessed in order to display the screen object "x11". The information "join obj76,obj34,obj11" indicates that objects "obj76", "obj34" and "obj11" within the ODB 107 should be joined in order to display the screen object "x11". The last information "related-object x87(parent),x256(child)" expresses that a screen object being the parent (display origin) of the screen object "x11" is "x87", while a screen object being the child (next display goal) of the screen object "x11" is "x256". In the example of FIG. 3, the definition of a screen object "x31" is similar to that of the screen object "x11".

Next, the query language generation unit 104 on the client side as shown in FIG. 1 generates a query language for the object-oriented database management system (ODBMS) 106, on the basis of the information items necessary for the application as transmitted from the application information extraction unit 103, and it issues the generated query language to the ODBMS 106 on the server side. Besides, the query language generation unit 104 causes the link meta-information management unit 105 to temporarily hold the generated query language. Now, when the application is to be developed, the user conducts GUI operations for pursuing the links between the objects, on the actual screen 101 in which links are expanded. In this case, the query language generation unit 104 generates the query language for pursuing the link between the objects.

FIG. 4 is a diagram showing a practicable example of the query language which the query language generation unit 104 generates. Referring to the figure, the first information "obj21 set os, o;" declares an operand set "os" for storing therein the set of the instances of an object "obj21" within the ODB 107, and an operand "o" for storing therein the single instance of the object "obj21". The information "obj763 o763;" declares an operand "o763" for storing therein the single instance of an object "obj763" within the ODB 107. The information "defaultOB ODB-model;" declares the use of a database "ODB-model" which is the ODB 107. The information "Transaction.start( );" commands the ODBMS 106 to start a transaction. The information "os=obj21 from obj21" commands the ODBMS 106 to retrieve the set of the instances of the object "obj21" within the ODB 107 and to store it in the operand set "os". Incidentally, in this case, a retrieval condition can also be specifically set by adding a word "where". The information "scan(os,o) [o.obj763.item211. get( );];" commands the ODBMS 106 to extract the instances of the object "obj21" successively one by one from the set of these instances of this object "obj21" within the ODB 107 as stored in the operand set "os" and to store the extracted instances in the operand "o", in order that the content of an item "item211" in the object "obj763" within the ODB 107 as linked to each of the instances stored in the operand "o" may be thereafter acquired with a method "get( )". This command corresponds to the operation for pursuing the link between the objects. The last information "Transaction.end( );" commands the ODBMS 106 to end the transaction.

Referring back to FIG. 1, the ODBMS 106 on the server side retrieves within the ODB 107 the instance of the object as pointed out by the query language generation unit 104 on the client side, and it sends the retrieved result back to the client side.

Upon receiving the retrieved result from the ODBMS 106 on the server side, the retrieval result display control unit 108 on the client side updates the display content of the actual screen 101 in which links are expanded. Thus, when the user on the client side pursues the links between the objects successively with the mouse on the actual screen 101 in which links are expanded, windows corresponding to the instances of the objects can be sequentially displayed on the screen as shown in FIG. 2 by way of example.

When the user gives the instruction of registering a predetermined series of links, in the process of his/her operations utilizing the actual screen 101 in which links are expanded, the link meta-information management unit 105 on the client side registers only the query language corresponding to the predetermined series of links among a series of query languages generated by the query language generation unit 104 and then held in the management unit 105 itself, formally as link meta-information items. Each of the link meta-information items contains, in combination, a user name, an application name, a database name, query language indicating one series of links, mapping information (class name and item name as redefined by the user), renewal date/time, or the likes. Incidentally, the GUI apparatus can also be so constructed that, among the link meta-information items to be stored in the link meta-information management unit 105, only those peculiar to each client are stored in the link meta-information management unit 105 on the client side, whereas, those allowed to be held in common among a plurality of clients on the server side are transferred to and stored in the link meta-information management unit 105' on the server side. In this case, the link meta-information items on the server side can be held as a management information file in the indicated directory of a file system. Alternatively, these link meta-information items can be held as one of the system classes of the ODB 107.

FIG. 5 is a diagram showing a practicable example of link meta-information. Referring to the figure, the first information "user-name:yamada" indicates a user name "Yamada". The information "appli-name:appl123" indicates an application name "appl123". The information "db-name:ODB-model" indicates a database name "ODB-model". The information "short-cut:obj21.obj763.item54" commands the ODBMS 106 to pursue in the application "appl123" the link which extends from an object "obj21" to the item "item54" of an object "obj763" within the ODB 107. The last information "mapping:(obj22,Product class), (obj62,Price class), (item211,Date)" expresses to assign a name "Product class" to an object "obj22", a name "Price class" to an object "obj62" and a name "Date" to an item "item211" within the ODB 107, in the application "appl123".

When the user gives the instruction of the execution of the application after having registered the link meta-information for the predetermined application in the above way, the application execution unit 110 in FIG. 1 accesses link meta-information 201 managed by the link meta-information management unit 105 on the client side or link meta-information 201' managed by the link meta-information management unit 105' on the server side, as shown in FIG. 2. Thus, this unit 110 derives the query language which indicates the series of links stated before and which is registered in correspondence with the particular application. Subsequently, this unit 110 issues the derived query language to the ODBMS 106 on the server side.

In consequence, the ODBMS 106 retrieves the series of indicated links from within the ODB 107, and it sends the retrieved result back to the application execution unit 110 on the client side.

The application execution unit 110 displays the retrieved result on the user's utilization screen 111.

More concretely, in the example of FIG. 2, the user has registered it as the link meta-information in correspondence with a predetermined application and by the use of the actual screen 101 in which links are expanded beforehand to pursue a series of links from an object storing the price information of a product therein, to an object storing the model information of the product therein, and to display an item corresponding to the price information of the product and an item corresponding to the model information of the product. As a result, when the user gives the instruction of the execution of the application, the user's utilization screen 111 as shown in FIG. 2 can be automatically displayed. In other words, the user has succeeded in the automatic creation of the appropriate application through the GUI operations utilizing the actual screen 101 in which links are expanded.

(2) Case where the application having the function of navigation is developed by starting from a GUI (the link viewer screen 102)

In this case, the user on the client side in FIG. 1 first gives the instruction of displaying the link viewer screen 102 in which an object pointed out is contained.

In compliance with the instruction, the application information extraction unit 103 on the client side extracts information on the object pointed out by the user, information for giving a command for the recursive retrieval of other objects linked to the pointed-out object, etc. as information items necessary for the application, and it transmits the extracted information items to the query language generation unit 104.

In the same manner as in the foregoing case (1), the query language generation unit 104 on the client side generates a query language for the ODBMS 106, on the basis of the information items necessary for the application as transmitted from the application information extraction unit 103, and it issues the generated query language to the ODBMS 106 on the server side. The query language in this case commands the ODBMS 106 to recursively retrieve the other objects linked to the object pointed out by the user.

The ODBMS 106 on the server side recursively retrieves within the ODB 107 the instances of the interlinked objects indicated by the query language generation unit 104 on the client side, and it sends the retrieved result back to the client side.

Upon receiving the retrieved result of the interlinked objects from the ODBMS 106 on the server side, the retrieval result display control unit 108 on the client side operates to display the received result as the link viewer screen 102.

Figure 6:
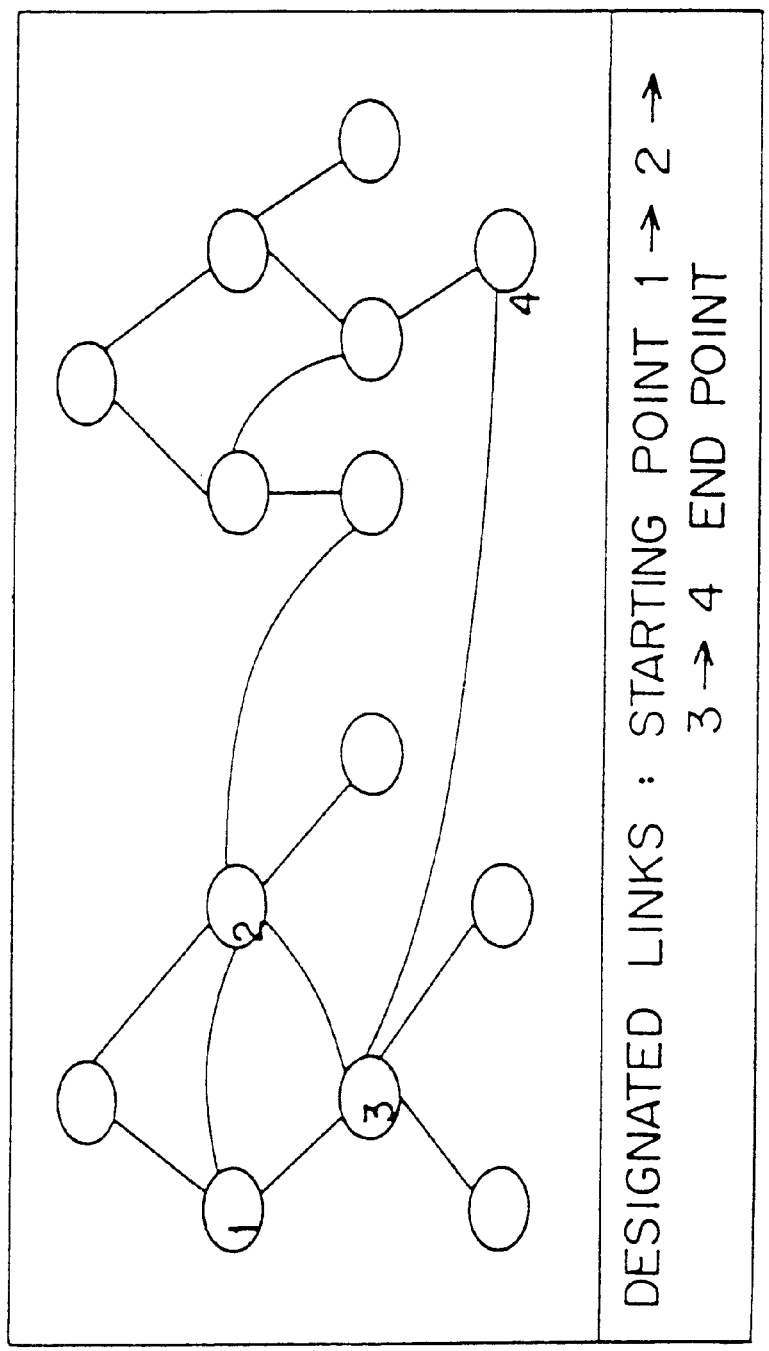
FIG. 6 is a diagram showing an example of a link viewer screen.

FIG. 6 is a diagram showing a practicable example of the link viewer screen 102. In the exemplified link viewer screen 102, the user clicks each of the objects in the order of, for example, 1→2→3→4 in FIG. 6 by the use of, for example, a mouse, whereby he/she can designate how to pursue links. Simultaneously with the click operations, the path of the series of links is displayed at the lower part of the screen as shown in FIG. 6.

When the user gives the instruction of registering a predetermined series of links, in the process of his/her operations utilizing the link viewer screen 102, the link meta-information management unit 105 on the client side registers only the query language correspondent to the predetermined series of links among query languages issued for the generation of the link viewer screen 102 by the query language generation unit 104, as link meta-information items. The subsequent operations for the execution of the application, etc. are the same as in the foregoing case (1).

Owing to the operations utilizing the link viewer screen 102 as explained above, the user can survey all the linkages among the objects contained in the ODB 107.

(3) Case where the skeleton of the application is directly defined with a database query language, and where the details of the application are successively developed while the defined contents are being displayed with a GUI.

In this case, the user on the client side in FIG. 1 registers that skeleton program of the application which the user has directly created with the predetermined database query language beforehand by utilizing the user's direct language definition unit 109.

In compliance with the registration, the user's direct language definition unit 109 transmits the string of query languages created by the user, to the application information extraction unit 103. The application information extraction unit 103 reversely extracts information necessary for the GUI, from within the string of the query languages, so as to generate and display the actual screen 101 in which links are expanded or the link viewer screen 102.

The subsequent operations are the same as in the foregoing case (1) or (2).

Owing to the allowance of such direct language definition by the user, a power user et al. can develop the database application more efficiently.

According to each of the preferred embodiments described above, all system administrants and all users including end users and power users can incarnate the development/maintenance of an application easily and efficiently with a GUI, without needing any special knowledge of a database query language. Moreover, the GUI apparatus of the embodiment can be utilized also as a debugging tool in the case where any problem has occurred in the service of the application.

What is claimed is:

1. A GUI apparatus for generating an object-oriented database application, comprising:

application information extraction means for extracting application information required for an access to an object-oriented database, in response to a user's screen operation including an operation for linking objects corresponding to the extracted application information contained in the object-oriented database;

query language generation means for receiving the application information, for generating a query language including the link pursuing operation, in correspondence with the received application information, and for issuing the generated query language to an object-oriented database management system which manages said object-oriented database;

retrieval result display control means for receiving a retrieved result from said object-oriented database management system, and for displaying a screen containing linkages among objects within said object-oriented database, in accordance with the retrieved result and for the purpose of prompting a user of said GUI apparatus to conduct screen operations;

link meta-information management means for registering and managing, in one or more query languages generated by said query language generation means, said query language being generated in correspondence with the screen operations and designated by the user to be registered, as link meta-information corresponding to the database application indicated by said user; and application execution means for executing said database application indicated by said user, on the basis of the link meta-information.

2. A GUI apparatus for generating an object-oriented database application as defined in claim 1, further comprising:

user-defined screen display means for inputting thereto a query language designated directly by said user, and for displaying a screen corresponding to the input query language and containing linkages among objects within said object-oriented database, for the purpose of prompting said user to conduct screen operations;

wherein said user conducts the screen operations including an operation for pursuing a link between the objects contained in said object-oriented database, on the screen displayed by said user-defined screen display means.

3. A GUI apparatus for generating an object-oriented database application, comprising:

application information extraction means for extracting application information which includes information on an object within an object-oriented database as pointed out by a user of the GUI apparatus, and information for giving a command for recursive retrieval of other objects within the object-oriented database as linked to the pointed-out object;

query language generation means for receiving the application information, for generating a query language for giving the command for the recursive retrieval of the other objects linked to the object pointed out by the user, corresponding to the received application information, and for issuing the generated query language to an object-oriented database management system which manages said object-oriented database;

link viewer screen display means for receiving a retrieved result from the object-oriented database management system, and for displaying all linkages among said object pointed out by said user and said other objects linked thereto, as a link viewer screen in accordance with the retrieved result;

link meta-information management means for registering and managing, in one or more query languages issued for generation of the link viewer screen by said query language generation means, said query language corresponding to the linkage pointed to on said link viewer screen by said user, as link meta-information corresponding to the database application designated by said user; and application execution means for executing said database application indicated by said user, on the basis of the link meta-information.

4. A GUI apparatus for generating an object-oriented database application as defined in claim 3, further comprising:

user-defined screen display means for inputting thereto a query language designated directly by said user, and for displaying said link viewer screen corresponding to the input query language and containing linkages among objects within said object-oriented database;

wherein said user points to the linkages on said link viewer screen displayed by said user-defined screen display means.

5. A GUI method for generating an object-oriented database application, comprising:

extracting application information required for an access to an object-oriented database, in response to a user's screen operation including an operation for pursuing a link between objects contained in the object-oriented database;

receiving the application information;

generating a query language including the link pursuing operation, corresponding to the received application information;

issuing the generated query language to an object-oriented database management system which manages said object-oriented database;

receiving a retrieved result from said object-oriented database management system;

displaying a screen containing linkages among objects within said object-oriented database, in accordance with the retrieved result and for the purpose of prompting a user of said GUI apparatus to conduct screen operations;

registering and managing, in one or more query languages, said query language being generated in correspondence with the screen operations and designated by the user to be registered, as link meta-information corresponding to the database application indicated by said user; and executing said database application indicated by said user, on the basis of the link meta-information.

6. A GUI method for generating an object-oriented database application, comprising:

extracting application information which includes information on an object within an object-oriented database as pointed out by a user of the GUI apparatus, and information for-giving a command for recursive retrieval of other objects within the object-oriented database as linked to the pointed-out object;

receiving the application information;

generating a query language for giving the command for the recursive retrieval of the other objects linked to the object pointed out by the user, corresponding to the received application information;

issuing the generated query language to an object-oriented database management system which manages said object-oriented database;

receiving a retrieved result from the object-oriented database management system; displaying all linkages among said object pointed out by said user and said other objects linked thereto, as a link viewer screen in accordance with the retrieved result;

registering and managing, in one or more query languages issued for generation of the link viewer screen, said query language corresponding to the linkage pointed to on said link viewer screen by said user, as link meta-information corresponding to the database application designated by said user; and executing said database application indicated by said user, on the basis of the link meta-information.

7. A computer-readable storage medium used to direct a computer to perform the functions of:

extracting application information required for an access to an object-oriented database, in response to a user's screen operation including an operation for pursuing a link between objects contained in the object-oriented database;

receiving the application information;

generating a query language including the link pursuing operation, corresponding to the received application information;

issuing the generated query language to an object-oriented database management system which manages said object-oriented database;

receiving a retrieved result from said object-oriented database management system; displaying a screen containing linkages among objects within said object-oriented database, in accordance with the retrieved result and for the purpose of prompting a user of said GUI apparatus to conduct screen operations;

registering and managing, in one or more query languages, said query language being generated in correspondence with the screen operations designated by the user to be registered, as link meta-information corresponding to the database application indicated by said user; and executing said database application indicated by said user, on the basis of the link meta-information.

8. A computer-readable storage medium used to direct a computer to perform the functions of:

extracting application information which includes information on an object within an object-oriented database as pointed out by a user of the GUI apparatus, and information for giving a command for recursive retrieval of other objects within the object-oriented database as linked to the pointed-out object; receiving the application information;

generating a query language for giving the command for the recursive retrieval of the other objects linked to the object pointed out by the user, corresponding to the received application information;

issuing the generated query language to an object-oriented database management system which manages said object-oriented database;

receiving a retrieved result from the object-oriented database management system; displaying all linkages among said object pointed out by said user and said other objects linked thereto, as a link viewer screen in accordance with the retrieved result;

registering and managing, in one or more query languages issued for generation of the link viewer screen, said query language corresponding to the linkage pointed to on said link viewer screen by said user, as link meta-information corresponding to the database application designated by said user; and executing said database application indicated by said user, on the basis of the link meta-information.

9. A GUI apparatus generating an object-oriented database application, comprising:

an application information extraction unit extracting application information required to access an object-oriented database in response to a user's screen operation including a linking operation linking objects corresponding to the extracted application information contained in the object-oriented database;

a query language generation unit receiving the application information and generating a query language including the link pursuing operation in correspondence with the received application information and issuing the generated query language to an object-oriented database management system which manages the object-oriented database;

a retrieval result display control unit receiving a retrieved result from the object-oriented database management system and displaying a screen containing linkages among objects within the object-oriented database in accordance with the retrieved result, prompting a user of said GUI apparatus to conduct screen operations;

a link meta-information management unit registering and managing, in one or more query languages generated by said query language generation unit, said query language generated in correspondence with the screen operations and designated by the user to be registered, as link meta-information corresponding to the database application indicated by the user; and an application execution unit executing the database application indicated by the user based the link meta-information.

* * * * *